J. J. BRIGNOLE AND J. LOVARI.
SAFETY FENDER.
APPLICATION FILED MAY 31, 1922.
1,432,380.
Patented Oct. 17, 1922.
3 SHEETS—SHEET 1.
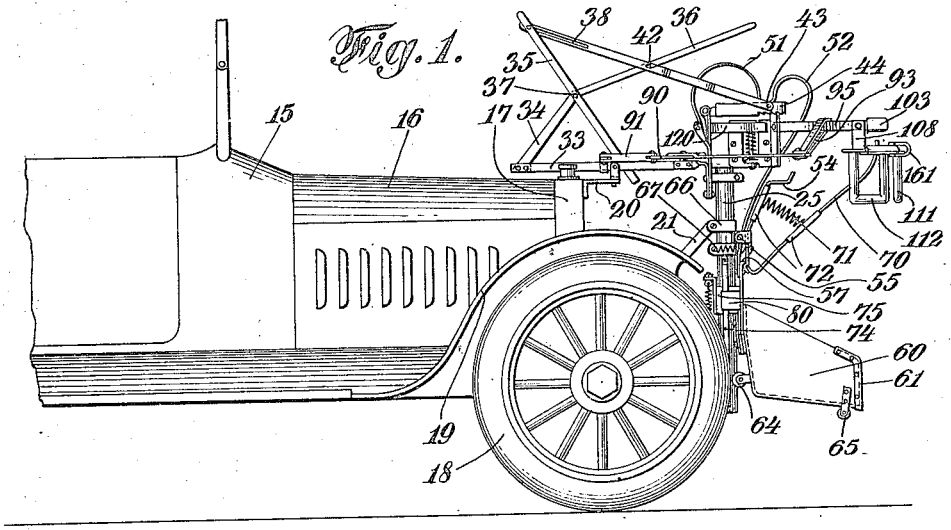
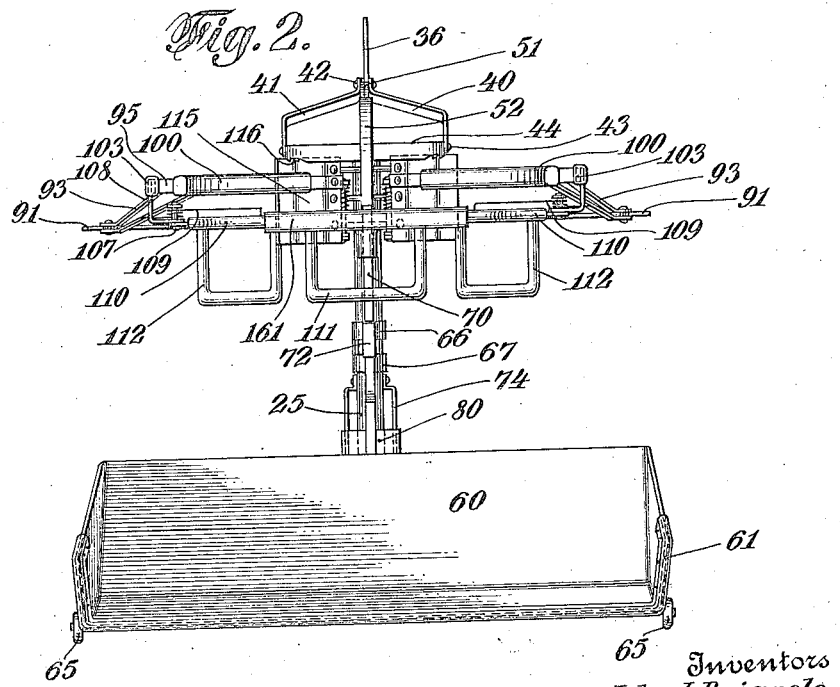
Inventors
John J. Brignole
John Lovari.
By their Attorney
Paul M Klein

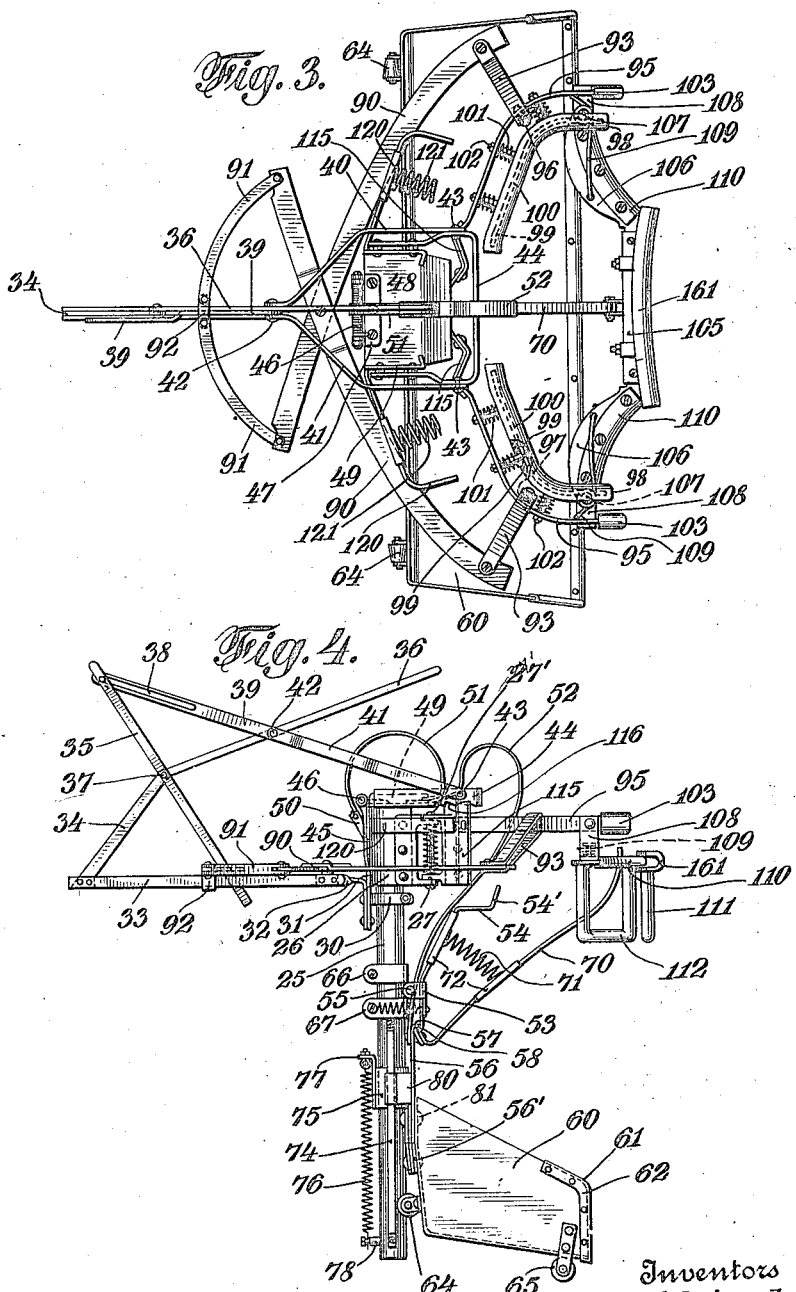

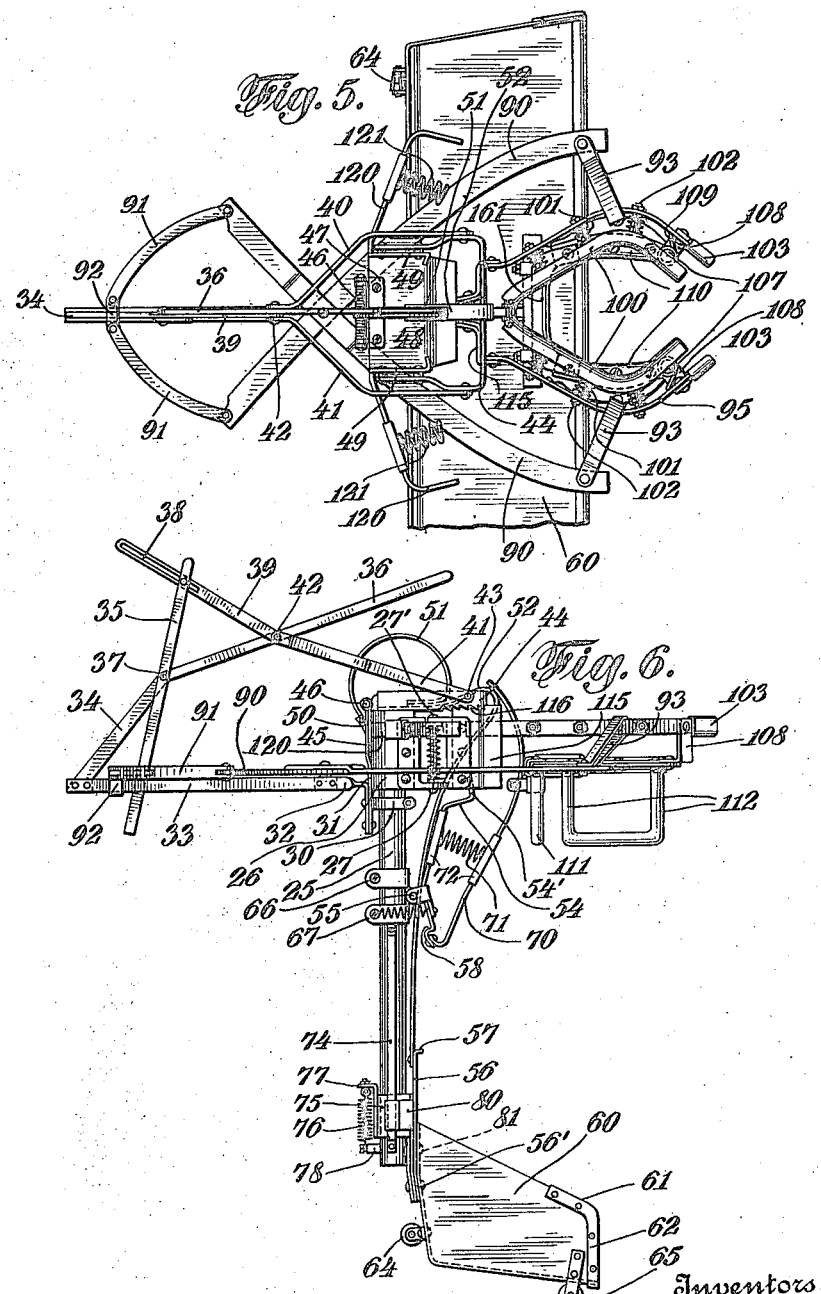

Patented Oct. 17, 1922.

1,432,380

UNITED STATES PATENT OFFICE.

JOHN J. BRIGNOLE AND JOHN LOVARI, OF NEW YORK, N. Y.

SAFETY FENDER.

Application filed May 31, 1922. Serial No. 564,967.

*To all whom it may concern:*

Be it known that we, JOHN J. BRIGNOLE, and JOHN LOVARI, citizens of the United States, and residents of New York, in the counties of Kings and New York, respectively, and State of New York, have invented certain new and useful Improvements in Safety Fenders, of which the following is a specification.

It is purposed to provide a fender or bumper guard for vehicles, of the self-propelled type, having means for yieldingly embracing and efficiently supporting without harm, an individual should a collision occur, the operative parts being automatically actuated by physical contact.

It is a further purpose of this invention to grasp a person upon opposite sides by cushioned contacts applied at different points with respect to height and also coincidently dispose a foot board rest or platform adjacent the surface of the path to receive the feet of the person setting the apparatus in operation.

A third object is to provide such guards in the form of an attachment readily applicable to existing types of automobiles, etc. without entailing changes or enormous difficulties in assembling or mounting.

Another result sought is in the provision of means for releasing the embracing arms and resetting the device by the operation of a single lever.

These and other like objects which will become apparent as the description progresses, are attained by the novel construction, combination and arrangement of parts hereinafter described and shown in the accompanying drawings, forming a material part of this disclosure, and in which:

Figure 1 is a side elevational view showing the front portion of a conventional type of automobile having an embodiment of the invention applied.

Figure 2 is a front view of the fender in normal position.

Figure 3 is a top plan view of the same.

Figure 4 is a side elevational view thereof.

Figure 5 is a plan view of the fender after operative contact with an object has been made.

Figure 6 is a side view of the device with the parts disposed as in Fig. 5.

Referring to the drawings, particularly Fig. 1, a common type of car is shown, its body, designated by the numeral 15, having a motor at the front covered by the hood or casing 16, with a radiator 17 in advance and supported on wheels, those at the front 18, having mud guards 19.

The fender as shown, is preferably made as a unit attachable to the front of a car as by a bracket 20, secured to the upper portion of the radiator and a strut member 21 secured at one end to the lower portion of the radiator.

The device is constructed largely of formed metal bars operatively connected or related one with another and are best shown for purposes of description when in the normal, open position as indicated in Figures 3 and 4, and in which 25 is a vertically disposed tubular post, to which is attached at the upper end a U shaped element 26, one wing of a spring hinge 27 being engaged on each of the extending sides of the element 26.

A clamp ring 30, engaging the post 25, is provided with a vertical bar 31 fixed thereon, extending down and engaging in rigid manner the angularly, down-turned twisted end of the horizontal bar element 32, to which is attached at a spaced distance, another bar 33.

Between these bars at the outer ends is a fixed bar 34 extending angularly upward and provided at its free end with means for pivotally engaging a lever 35, and the operating lever 36 from a common pivotal point 37.

The upper end of the lever 35 has a pivot adapted to slide in the slot 38 of another lever 39, while the lower end of the lever 35 moves freely in the space between the horizontal bars 32 and 33.

A yoke comprising a pair of offset bar elements 40 and 41 are pivoted at their contracted ends, adjacent the levers 36 and 39 by a pivot 42. The opposite widened end of the yoke is pivoted as at 43 to offset extending sides of a continuous integral bar yoke 44.

A plate 45 is attached to an arcuate end of the U shaped element 26 and one wing of a spring hinge 46 is fixed with the plate, the other wing 47 is secured to a rectangular plate 48 having upturned sides 49 adapted to stiffen the plate and provide means for securing the ends of the yoke 44 thereto.

Continuing upward, the bar 31 terminates as a forked element 50 adapted to engage a flat semi-circular spring element 51, its free end adapted to be attached to the front end of the plate 48 and to assist in holding it in horizontal position.

A reversely curved spring 52 extends downward, passing through the clip 53 between the deflector rod 54 and the pivot 55 and is attached at the lower end to a vertical bar 56, the upper end having a right angled outward bend 57 providing a locking means adapted to engage the hook element 58 of the deflector rod 54.

The lower portion of the vertical bar 56 is provided with side extensions 56' adapted to be secured to the back of a supporting scoop platform 60, having its front edge protected by a cushion element 61 secured in place by metal strips 62.

Rolls, as at 64 are provided near the ends of the scoop back and are adapted to prevent damage to the scoop from contact with the vehicle wheels, and other rolls 65 extend below the bottom and prevent the scoop from direct contact with the ground.

At a point midway the length of the post 25 are clamps 66 and 67, joined by a connecting element having a lug through which is pivoted a clip 53, having a downward extending element fixedly engaging a spring deflecting element 54, comprising a bent locking element 58 at the lower end and a stop element 54' at the upper end. Secured to the lower end of the deflector is a formed flat spring 70 extending angularly upward and held normally separated from the deflector by a coiled spring 71 whose ends are engaged by pads 72 fixed to the spring and deflector elements.

Guide rods 74, offset at their ends, are secured on opposite sides of the post 25, and a sleeve 75, slidably engaged about the post is urged downwardly by the pull of a spring 76, secured at its ends by an angularly bent plate 77, fixed to the sleeve, and a stud 78 fixed in the lower end of the post.

A plate 80, having folded ends engageable with the guide rods 74, is attached to the sleeve and provided with a depending tail adjacent the bar 56. These elements 56 and 80 are rigidly secured to the scoop back by rivets 81, thus forming a complete unit slidable on the post 25 and adapted to be drawn down by spring action when the locking element 58 is released from the bar hook 57.

A unit consisting of pivoted elements forming lazytongs, comprising a pair of curved arms 90, horizontally positioned and provided with means for pivotally connecting one to the other and also to the spaced bars 32 and 33.

The rear short end of the crossed arms are pivoted within forked ends of a pair of arcuately curved link members 91, their opposite ends being pivoted to a cross element 92 slidable along the bars 32 and 33.

Near the forward ends of the curved arms 90, are a pair of loop formed links 93 whose open ends straddle and are pivoted to the arms, while the opposite or widened ends resiliently engage the curved body grasping arms 95, resilient connection being effected by means of a bolt 96 passing through the link and arms and a spring 97 interposed therebetween provides flexible engagement.

Body contact members 98 consist of formed bars 99 to which are secured elastic cushions 100. These members are held resiliently apart from the arms 95 by the action of the springs 101, co-acting with the bolts 102, and cushion covers 103 are attached to the ends of the arms 95.

Fender elements comprise a center member 105, pivotally connected to a pair of side members 106, the outer ends of which are pivotally engaged by studs 107 fixed in an angular bent plate 108 riveted to the body arms 95.

The fender elements are normally held in a forward extended position as shown in Fig. 3, by the springs 109 coiled about the studs 107, the ends of the springs extend and are engaged at one end with the arms 95 the other end having a down-turned bend is seated in an opening formed in the elements 106.

Elastic cushion elements are provided on the fender members, as at 161, and members 110, having vertically depending cross connected fending elements 111 and 112, rigidly attached to the fender elements 105 and 106 are also provided with elastic cushions.

The moving wing elements of the spring hinges, of which 27' is the hinge pin, are attached to rectangular formed plates 115, the outer portion providing means for securing the rear ends of the body arms 95, while the upper edges are adapted to engage the teeth 116, formed on the lower edge of the yoke 44, thereby providing means for preventing the body arms from opening until the yoke is raised by an upward movement of the lever 36.

A bumper 120 having a pair of coiled springs 121 fixed thereon is provided to prevent undue shock when the device is operated.

The operation of the device is simple and is presupposed to be attached to the front of a vehicle, particularly to an automobile or auto-truck.

Figures 3 and 4 indicate the device in normal operable position, that is the fenders are in advanced forward position, the body clutching arms are in open extended arrangement and the scoop platform is raised and locked.

Impact against the fender element 61 as in striking a human body, causes the fending elements to retract, the movement compelling the body clutching arms to be drawn or closed together and simultaneously the platform is caused to drop and the parts assume position shown in the Figures 5 and 6. In this position the body arms are locked and a body held therein is prevented from slipping down, the platform affording support and providing against danger from being dragged along the ground.

Release is accomplished by the up-pull of the lever 36, which automatically resets the parts in positions shown in Figures 3 and 4.

As changes of construction could be made within the scope of the invention, it is intended that all matter contained in the foregoing description or shown in the accompanying drawings shall be interpreted as illustrative and not in a limiting sense.

Having thus described my invention, what I claim as new and desire to secure by Letters Patent, is:

1. A safety fender for vehicles, comprising body encircling arms, flexible resilient cushions adjacent the inner sides of said arms, hinged fender bars extending forward when in normal position, means for retracting said fender bars, means associated with said fender bars for causing the encircling arms to be drawn together simultaneously with retraction of the fender bars, and other means for locking the encircling arms in closed position.

2. A safety fender for vehicles, comprising body encircling arms, hinged fender bars adapted to retract by impact, as against a human body, means for manually causing said arms to be opened, means operating between the arms and fender bars for maintaining said arms and fender bars in normal extended position, a post secured to the vehicle, guide bars on opposite sides of the post, a scoop platform, a sleeve slidable on the post, and means interposed between said post and scoop for controlling the movement of said scoop.

3. A safety fender device for vehicles comprising encircling arms, retractable fender bars hingedly engaged with said arms, means for manually opening the arms, means whereby the arms are caused to close about a human body when the fender bars are retracted by impact with the body, a scoop platform adapted to receive and support the lower limbs of the body when held in the grasp of the encircling arms, and means for releasing and causing the scoop platform to drop into operative position, simultaneously with the retraction of said fender bars.

4. A safety fender device for vehicles, comprising encircling arms, auxiliary cushioned grasping members, resiliently engaged with said arms retractable articulated fender bars hingedly connected to the arms, means with said fender bars for holding the arms in open extended position, and other means associated with said arms for locking them about a body when closed by retractive action of the fender bars, a vertically disposed post, a scoop platform slidably adjacent said post, said scoop being adapted to give foot hold to a person supported by the encircling arms, means for holding the scoop in elevated position, and means for automatically releasing the scoop holding means simultaneously with the retraction of the fender bars.

5. A safety device comprising a pair of pivotally mounted horizontally disposed body clutching arms, arcuately curved levers operable in the same plane and resiliently connected with said arms, a pair of spaced bars extending rearwardly said spacing forming a slot, a lever operable in the slot, a block slidable on the bars, a pair of arcuate links having one end pivotally engaged with said sliding block and the other ends pivotally connected to the free ends of the curved levers, said levers being crossed one above the other, and pivotally engaged at the point of crossing with said spaced bars, and means with said links and said levers for causing the clutching arms to be opened or closed.

6. A safety device comprising body clutching arms, a platform adapted to protect and support the lower limbs of a body grasped by said arms, the platform consisting of a metal scoop-like structure open at the front and top, resilient cushions secured to the front edges thereof, rolls mounted on the bottom of said platform contactable with the ground, a post vertically depending from the vehicle, means adjacent said post for guiding the platform, means for locking the platform in normal raised position, and means for automatically releasing the platform simultaneously with the closing of the clutching arms.

7. A safety fender device comprising body clutching arms, a supporting protective platform below said arms, fender members normally in advance of said arms, means for causing the fender members to be held normally in advance of the arms, vertically depending fending frames rigid with the fender members, a locking spring associated with the movable platform, means with said spring for releasing the platform when the fender is retracted by impact, and means for locking said arms in closed position when the fender has been retracted.

Signed at New York in the county of New York and State of New York this 29 day of April A. D. 1922.

JOHN J. BRIGNOLE.
JOHN LOVARI.